US012687412B2

(12) United States Patent　　(10) Patent No.:　US 12,687,412 B2
Lee　　(45) Date of Patent:　Jul. 21, 2026

(54) ROTATING DISPLAY APPARATUS

(71) Applicant: LG ELECTRONICS INC., Seoul (KR)

(72) Inventor: Soobeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 18/711,956

(22) PCT Filed: Jan. 17, 2022

(86) PCT No.: PCT/KR2022/000808
§ 371 (c)(1),
(2) Date: May 21, 2024

(87) PCT Pub. No.: WO2023/136382
PCT Pub. Date: Jul. 20, 2023

(65) Prior Publication Data
US 2025/0006087 A1　　Jan. 2, 2025

(51) Int. Cl.
G01D 5/34　　(2006.01)
G01D 5/347　　(2006.01)
(52) U.S. Cl.
CPC ................................. G01D 5/3473 (2013.01)
(58) Field of Classification Search
CPC .. G01D 5/347; G01D 5/34715; G01D 5/3473; G01D 5/34776
See application file for complete search history.

(56) References Cited

U.S. PATENT DOCUMENTS

| | | | |
|---|---|---|---|
| 8,546,747 B2 | 10/2013 | Nagura | |
| 2023/0004019 A1* | 1/2023 | Lee | G02B 30/54 |

FOREIGN PATENT DOCUMENTS

| | | |
|---|---|---|
| KR | 10-2007-0108588 A | 11/2007 |
| KR | 10-1981850 B1 | 5/2019 |
| KR | 10-2020800 B1 | 9/2019 |
| WO | WO 2021/040081 A1 | 3/2021 |

* cited by examiner

*Primary Examiner* — Kevin K Pyo
(74) *Attorney, Agent, or Firm* — Birch, Stewart, Kolasch & Birch, LLP

(57)　　　ABSTRACT

The present invention is applicable to the display apparatus-related technical field, and relates to, for example, a rotating display apparatus using a light-emitting diode (LED) which is a semiconductor light-emitting device. The present invention provides the rotating display apparatus comprising: a fixing portion including a motor; a rotating portion located on the fixing portion and rotated by the motor; a light source module including a light-emitting element array coupled to the rotating portion and displaying an image by using an afterimage caused by the rotation of the rotating portion; and an encoder positioned between the fixing portion and the rotating portion to synchronize an image displayed by the light-emitting element array at a predetermined position when the rotating portion rotates, wherein the encoder comprises: a light-emitting portion continuously emitting light; a light-receiving portion receiving light emitted from the light-emitting portion through at least two paths; and a disk-shaped scaler disposed between the light-emitting portion and the light-receiving portion and having a plurality of slits formed along the circumferential direction.

18 Claims, 16 Drawing Sheets

(a)

(b)

(a)

(b)

(a)

(b)

ROTATING DISPLAY APPARATUS

CROSS REFERENCE TO RELATED APPLICATIONS

This application is the National Phase of PCT International Application No. PCT/KR2022/000808, filed on Jan. 17, 2022, all of which are hereby expressly incorporated by reference into the present application.

TECHNICAL FIELD

The present disclosure is applicable to display apparatus-related technical fields and relates to, for example, a rotatable display apparatus using a light-emitting diode (LED), which is a semiconductor light-emitting device.

BACKGROUND ART

When a light-emitting module (light source bar) in which a light source is arranged one-dimensionally is driven at high speed, various text, graphics, and even moving images may be reproduced by an afterimage effect of the human eye. Light-emitting diodes (LEDs) are commonly used as such a light source.

Generally, when continuously observing 24 or more still images per second, a viewer perceives the still images as a moving image. Still images of 30 to 60 frames per second are displayed so as to be recognized by the viewer as the moving image. In this case, when more still images are continuously observed per second, the motion of the images may appear smoother to the observer.

In this way, a display apparatus that implements images while rotating the light source is called a rotatable afterimage display apparatus.

Such a rotational afterimage display apparatus includes a fixed portion and a rotary portion. For example, an external power receiving part, a motor driving circuit, etc. may be located in the fixed portion, and a display driving device, a light source bar, etc. may be located in the rotary portion. Therefore, a power supply device of the rotatable afterimage display apparatus may include a portion that transmits power (power source) from the fixed portion to the rotary portion.

When implementing the rotatable afterimage display apparatus, it is necessary to synchronize the rotational speed of the rotary portion with a scanning frame of the light source in order to reproduce a desired image or video always at a constant position.

There may be several methods to synchronize an image and a specific position of the light source. For example, an encoder using infrared light may be applied.

In this way, even when scanning is performed by synchronizing the image and the specific position of the light source using the encoder, if the rotational speed of the rotary portion changes while the light source rotates, momentary shaking or distortion of the image may occur in a duration in which the speed changes.

Therefore, constant speed control of the rotary portion may be required. Constant speed control refers to controlling a motor to maintain a constant speed by detecting the rotational speed of the rotary portion when the rotational speed of the rotary portion changes structurally due to eccentricity of the rotary portion and the like.

However, even if the motor having such a constant speed control function is used, a physical time to adjust speed by detecting the rotational speed of the rotary portion and changing the force (torque) of a rotary body is inevitably greater than a scanning time (about $\frac{1}{60}$ seconds) corresponding to one display frame of the light source. Therefore, in a situation in which the speed of the motor is not constant, it may be very difficult to control the motor such that the rotary portion rotates at a constant speed.

Therefore, a method is required to implement a smooth display by controlling the rotary portion to rotate at a constant speed and synchronizing an image with a specific position of a light source in a rotatable display apparatus.

DISCLOSURE

Technical Problem

The present disclosure provides a rotatable display apparatus that may improve frame distortion due to a change in rotational speed of a rotary portion.

In addition, the present disclosure provides a rotatable display apparatus that may synchronize a display according to rotational speed through position information (trigger signal) of the first scan line of the display.

In addition, an embodiment of the present disclosure provides a rotatable display apparatus that may reduce a space occupied by an encoder when configuring the encoder and increase the degree of freedom in spatial configuration below a scaler.

In addition, the present disclosure provides a rotatable display apparatus that may more efficiently arrange components of the rotatable display apparatus due to the reduced space.

Technical Solution

According to a first aspect of the present disclosure, provided herein is a rotatable display apparatus, including a fixed portion including a motor; a rotary portion located on the fixed portion and configured to rotate by the motor; a light source module coupled to the rotary portion and including a light-emitting device array configured to display an image using an afterimage caused by rotation of the rotary portion; and an encoder located between the fixed portion and the rotary portion and configured to synchronize the image displayed by the light-emitting device array at a constant position based on rotation of the rotary portion. The encoder may include: a light emitter configured to continuously emit light; a light receiver configured to receive the light emitted from the light emitter through at least two paths; and a disc-shaped scaler located between the light emitter and the light receiver and having a plurality of slits formed in a circumferential direction.

As an exemplary embodiment, the light receiver may include: a first light receiver configured to receive the light emitted from the light emitter through a first path; and a second light receiver configured to receive the light emitted from the light emitter through a second path.

As an exemplary embodiment, the rotatable display apparatus may further include a first switcher located between any two of the plurality of slits to switch the light emitted from the light emitter to the second path.

As an exemplary embodiment, the first switcher may include a reflector.

As an exemplary embodiment, the reflector may be formed in the first switcher and may be located on an inclined surface configured to switch the first path to the second path.

As an exemplary embodiment, the first switcher may be located on a same circumferential line as the plurality of slits.

As an exemplary embodiment, the rotatable display apparatus may further include a second switcher located between any two of the plurality of slits to switch the light emitted from the light emitter to a third path.

As an exemplary embodiment, the third path maybe in an opposite direction to the second path.

As an exemplary embodiment, the rotatable display apparatus may further include a third light receiver configured to receive the light emitted from the light emitter through the third path.

As an exemplary embodiment, the second switcher may include an inclined surface configured to switch the first path to the third path.

As an exemplary embodiment, the light source module is coupled to the rotary portion and includes light-emitting device array arranged in a longitudinal direction on at least one panel arranged radially or at least one panel arranged along a cylindrical surface.

According to a second aspect of the present disclosure, provided herein is a rotatable display apparatus, including a fixed portion including a motor; a rotary portion located on the fixed portion and configured to rotate by the motor; a light source module coupled to the rotary portion and including a light-emitting device array configured to display an image using an afterimage caused by rotation of the rotary portion; and an encoder located between the fixed portion and the rotary portion and configured to synchronize the image displayed by the light-emitting device array at a constant position based on rotation of the rotary portion. The encoder may include a light emitter configured to continuously emit light; a light receiver configured to receive the light emitted from the light emitter in at least two different periods; and a disc-shaped scaler located between the light emitter and the light receiver and having a plurality of slits formed in a circumferential direction.

As an exemplary embodiment, the light receiver may include: a first light receiver configured to receive the light emitted from the light emitter in a first period; and a second light receiver configured to receive the light emitted from the light emitter in a second period.

Advantageous Effects

According to an embodiment of the present disclosure, the following effects are achieved.

First, according to an embodiment of the present disclosure, a rotatable display apparatus may improve frame distortion due to a change in rotational speed of a rotary portion.

According to an embodiment of the present disclosure, a display may be synchronized according to rotational speed through position information (trigger signal) of the first scan line of the display.

Further, according to an embodiment of the present disclosure, when configuring an encoder, a space occupied by the encoder may be reduced.

Specifically, since a slit shape of the encoder may be configured on the outside of a scaler, the degree of freedom in spatial configuration below the scaler may be increased.

Furthermore, due to this reduced space, components of the rotatable display apparatus may be arranged more efficiently.

In addition, not only may the number of light emitters constituting the encoder be reduced, but volume occupied by an optical path may also be reduced.

Additionally, the encoder may generate an additional signal, and this additional signal may be used to control a rotary portion more precisely or may be used for other purposes.

There may be also additional technical effects not mentioned herein, and a person skilled in the art may understand these effects through the entire meaning of the specification and drawings.

BEST MODE

Figure 1:
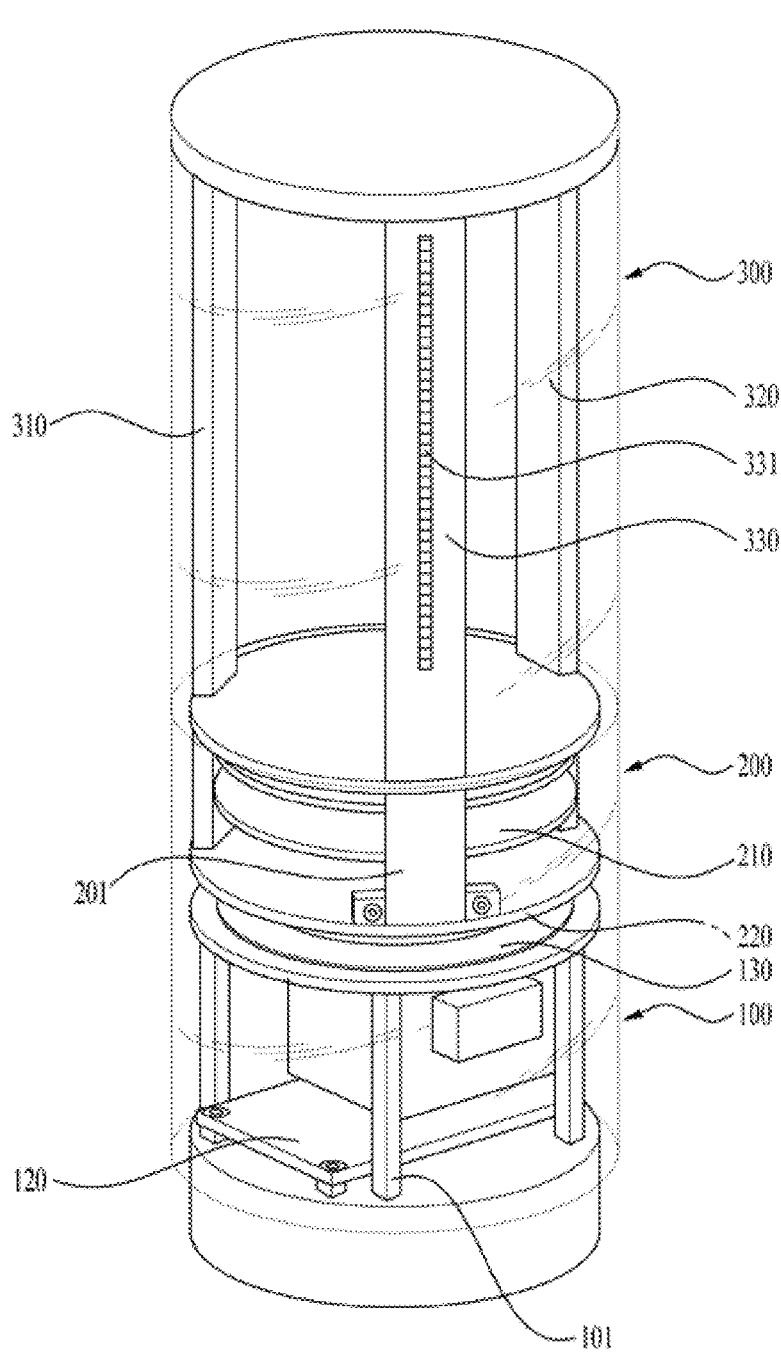
FIG. 1 is a perspective view illustrating a first embodiment of a rotatable display apparatus applicable to the present disclosure.

FIG. 1 is a perspective view of a rotatable display device according to a first embodiment of the present disclosure.

FIG. 1 illustrates a cylindrical-shaped rotatable display device in which light-emitting element arrays 331 are provided on one or more panels 310, 320, and 330, which are disposed along a cylindrical surface, in the longitudinal direction of each of the panels. FIG. 1 illustrates a state in which only the light-emitting device array 331 provided on the front panel 330 is shown. In the drawing, although a light-emitting device array provided in each of the left panel 310 and the right panel 320 is not shown, each of the left panel 310 and the right panel 320 may also be provided with the light-emitting device array of the same structure (311; see FIG. 3).

Such a rotatable display device may broadly include a fixed portion 100, which includes a motor 110 (refer to FIG. 7), a rotary portion 200, which is located on the fixed portion 100 and is rotated by the motor 110, and a light source module 300, which is coupled to the rotary portion 200 and includes the light-emitting element arrays 331 mounted on the panels 310, 320, and 330 (hereinafter, "first panel) so as to be implemented as a display by creating an afterimage resulting from rotation.

In this case, the light source module 300 may include the light-emitting element arrays 331, which are mounted on one or more bar-shaped first panel 310, 320, and 330, which are arranged at regular intervals on the outer circumferential surface of the cylinder in the longitudinal direction of each of the panels.

Referring to FIG. 1, the light source module 300 may include the first panel 310, 320, and 330, on which the light-emitting element arrays 331 (hereinafter, first light-emitting element arrays) are provided. However, this is given merely by way of example, and the light source module 300 may include one or more panels.

In the first light-emitting element arrays 331, individual pixels may be disposed on the first panel 310, 320, and 330 in the longitudinal direction of each of the panels. In this case, subpixels constituting the individual pixels may be disposed along a direction perpendicular to the longitudinal direction. Meanwhile, sub-pixels constituting an individual pixel may be arranged horizontally in the longitudinal direction.

In addition, the subpixels may sequentially emit light in the individual pixels.

A detailed description of the first light-emitting element arrays 331 provided in the light source module 300 will be given later.

Each of the panels 310, 320, and 330 constituting the light source module 300 may be configured as a printed circuit board (PCB). That is, each of the panels 310, 320, and 330 may have the function of a printed circuit board. Each of the light-emitting element arrays may be implemented as an individual unit pixel, and may be disposed on a corresponding one of the panels 310, 320, and 330 in the longitudinal direction of the corresponding panel.

The panels provided with the light-emitting element arrays may be implemented as a display using an afterimage created by rotation thereof. Implementation of an afterimage display will be described later in detail.

As described above, the light source module 300 may be constituted by a plurality of panels 310, 320, and 330. However, the light source module 300 may be constituted by a single panel provided with a light-emitting element array. When the light source module 300 is constituted by a plurality of panels, as illustrated in FIG. 1, the plurality of panels may realize one frame image in a shared manner, and may thus be rotated at a lower speed when realizing a given frame image.

Meanwhile, the fixed portion 100 may include a frame structure. That is, the fixed portion 100 may include a plurality of frames 101, which are separately provided and are coupled to each other.

This frame structure may provide a space in which the motor 110 is mounted, and may provide a space in which a power supply 120 and an RF module 126 (refer to FIG. 7) are mounted.

In addition, a weight (not shown) may be mounted to the fixed portion 100 in order to reduce the influence of high-speed rotation of the rotary portion 200.

Similarly, the rotary portion 200 may include a frame structure. That is, the rotary portion 200 may include a plurality of frames 201, which are provided separately and are coupled to each other.

This frame structure may provide a space in which a driving circuit 210 for driving a first light-emitting element arrays 331 in order to implement a display is mounted.

In this case, the driving shaft of the motor 110 may be fixed to a shaft-fixing portion (not shown) formed at the frame 201 of the rotary portion 200. In this way, the driving shaft of the motor 110 and the center of rotation of the rotary portion 200 may be coaxially located.

Further, the light source module 300 may be fixedly mounted on the frame 201.

Meanwhile, the fixed portion 100 and the rotary portion 200 may transfer power therebetween in a wireless power transfer manner. To this end, a transmission coil 130 for transferring wireless power may be mounted to an upper portion of the fixed portion 100, and a reception coil 220 may be mounted to a lower portion of the rotary portion 200 so as to be located at a position facing the transmission coil 130.

Figure 2:
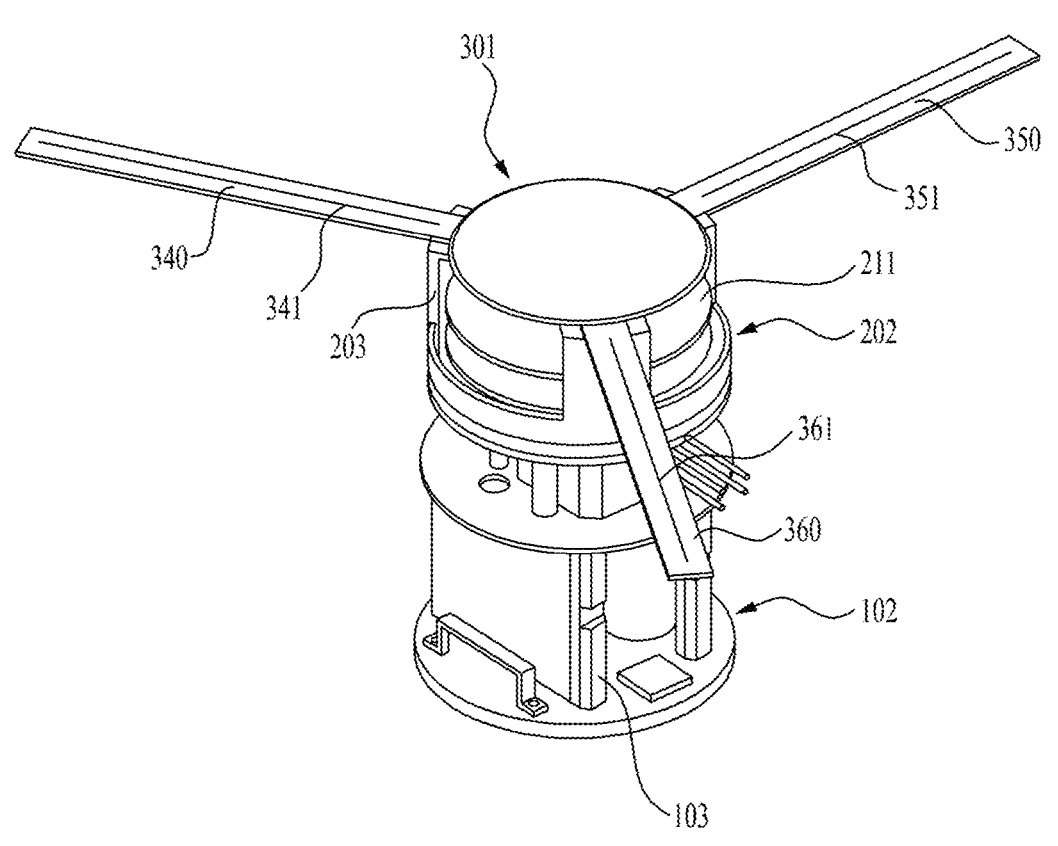
FIG. 2 is a perspective view illustrating a second embodiment of the rotatable display apparatus applicable to the present disclosure.

FIG. 2 is a perspective view of a rotatable display device according to a second embodiment of the present disclosure.

FIG. 2 illustrates a rotatable display device in which light-emitting element arrays 341, 351, 361 (hereinafter, second light-emitting element arrays) are provided on blade-type panels 340, 350, and 360 (hereinafter, second panel) in the longitudinal direction of each of the panels.

Such a rotatable display device may broadly include a fixed portion 102, which includes a motor 110 (refer to FIG. 7), a rotary portion 202, which is located on the fixed portion 102 and is rotated by the motor 110, and a light source module 301, which is coupled to the rotary portion 202 and includes the second light-emitting element arrays 341, 351, 361 so as to be implemented as a display by creating an afterimage resulting from rotation.

As illustrated, the light source module 301 may include one or more bar-shaped second panels 340, 350, and 360, which are disposed radially around the center of rotation, and second light-emitting element arrays 341, 351, 361, which are disposed on the panels 340, 350, and 360 in the longitudinal direction of each panel.

In the above manner, the light source module 301 may be constituted by the second panels 340, 350, and 360, on which the second light-emitting element arrays 341, 351, 361 are disposed.

The light source module 301 may be constituted by a plurality of the second panels 340, 350, and 360. However, the light source module 301 may be constituted by a single panel provided with a light-emitting element array. When the light source module 301 is constituted by a plurality of panels, as illustrated in FIG. 2, the plurality of panels may realize one frame image in a shared manner, and may thus be rotated at a lower speed when realizing a given frame image.

In the second light-emitting element arrays 341, 351, 361, individual pixels may be disposed on the second panels 340, 350, and 360 in the longitudinal direction of each of the panels. In this case, subpixels constituting the individual pixels may be disposed along a direction perpendicular to the longitudinal direction. Meanwhile, sub-pixels constituting an individual pixel may be arranged horizontally in the longitudinal direction.

A detailed description of the second light-emitting element arrays 341, 351, 361 provided in the light source module 301 will be given later.

Meanwhile, the fixed portion 102 may include a frame structure. That is, the fixed portion 102 may include a plurality of frames 103, which are separately provided and are coupled to each other.

This frame structure may provide a space in which the motor 110 is mounted, and may provide a space in which a power supply 120 and an RF module 126 (refer to FIG. 7) are mounted.

In addition, a weight (not shown) may be mounted to the fixed portion 102 in order to reduce the influence of high-speed rotation of the rotary portion 202.

Similarly, the rotary portion 202 may include a frame structure. That is, the rotary portion 202 may include a plurality of frames 203, which are provided separately and are coupled to each other.

This frame structure may provide a space in which a driving circuit 210 for driving the second light-emitting element arrays 341, 351, 361 in order to implement a display is mounted.

In this case, the driving shaft of the motor 110 may be fixed to a shaft-fixing portion (not shown) formed at the frame 203 of the rotary portion 202. In this way, the driving shaft of the motor 110 and the center of rotation of the rotary portion 202 may be coaxially located.

Further, the light source module 301 may be fixedly mounted on the frame 203.

The second embodiment of the present disclosure, which has been described above with reference to FIG. 2, is substantially the same as the first embodiment, except for the difference in the configuration of the light source module 301. Thus, with regard to any aspect of the second embodiment that is not described herein, reference may be made to the description of the configuration of the first embodiment.

Figure 3:
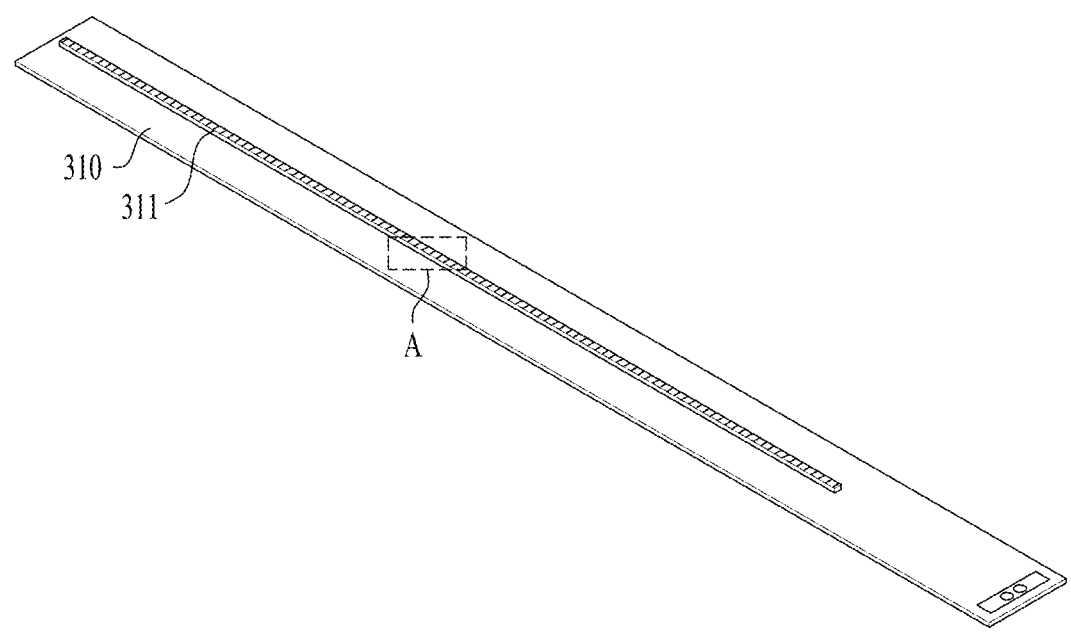
FIG. 3 is a perspective view illustrating the front surface of a light source module according to the first embodiment of the present disclosure.
Figure 4:
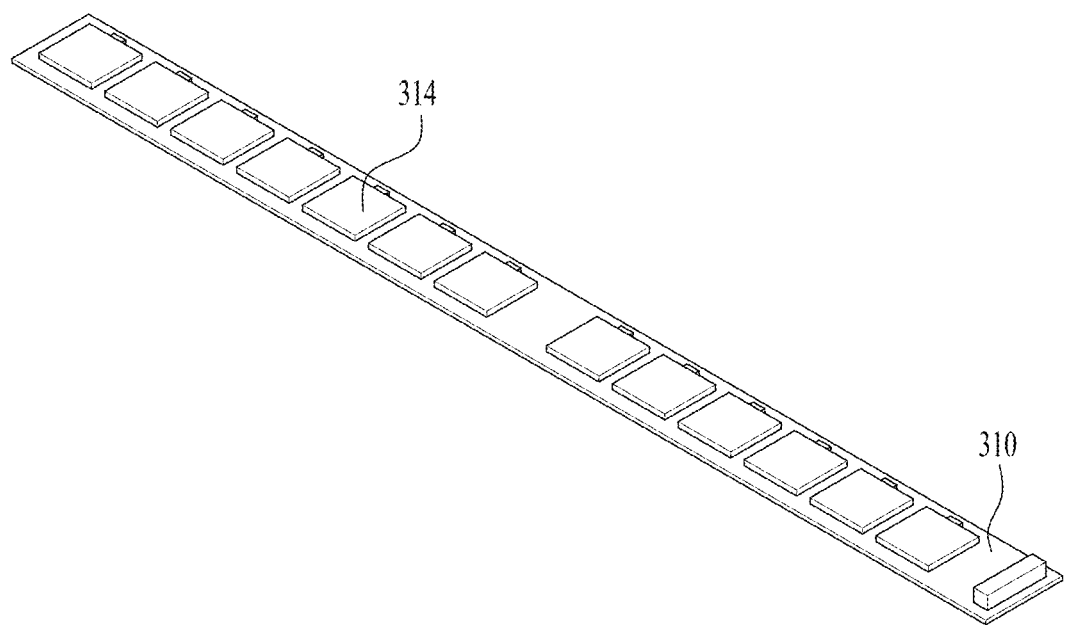
FIG. 4 is a perspective view illustrating the rear surface of the light source module according to the first embodiment of the present disclosure.

FIG. 3 is a perspective view showing the front surface of the light source module according to a first embodiment of the present disclosure, and FIG. 4 is a perspective view showing the rear surface of the light source module according to a first embodiment of the present disclosure.

Although FIGS. 3 and 4 illustrate the first panel 310 of the rotatable display device of the first embodiment as an example, the configuration illustrated in FIGS. 3 and 4 may be identically applied not only to the other panels 320 and 330 but also to the second panels 340, 350, and 360 of the second embodiment. That is, the light source module of the first embodiment and the light source module of the second embodiment may have the same configuration.

In other words, the first light-emitting device array 311 and the second light-emitting device arrays 341, 351, and 361 may have the same structure. Hereinafter, the light source module will be described focusing on the first light-emitting device array 311.

FIG. 3 illustrates one panel 310 forming the light source module 300. As mentioned above, the panel 310 may be a printed circuit board (PCB). A plurality of light-emitting elements 312 (refer to FIG. 5) may be mounted on the panel 310 so as to be disposed in one direction to form pixels, thereby constituting the light-emitting element array 311. Here, a light-emitting diode (LED) may be used as the light-emitting element.

That is, the light-emitting elements 312 are disposed in one direction on one panel 310 to form individual pixels, with the result that the light-emitting element array 311 may be provided so as to be linearly mounted.

FIG. 4 illustrates the rear surface of the panel 310. Drivers 314 for driving the light-emitting elements 312 may be mounted on the rear surface of the panel 310, which constitutes the light source module.

Since the drivers 314 are mounted on the rear surface of the panel 310, as described above, the drivers 314 may not interfere with a light-emitting surface, the influence on light emission from the light sources (the light-emitting elements) 312 due to interference may be minimized, and the area of the panel 310 may be minimized. The panel 310, having a small area, may improve the transparency of the display.

Meanwhile, the front surface of the panel 310, on which the light-emitting element array 311 is mounted, may be processed into a dark color (e.g. black) in order to improve the contrast ratio and the color expression of the display, thereby maximizing the effect of the light sources.

Figure 5:
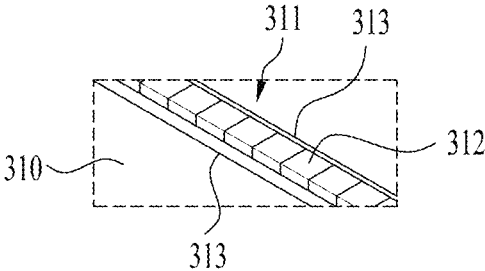
FIG. 5 is an enlarged view of portion A in FIG. 3.
Figure 6:
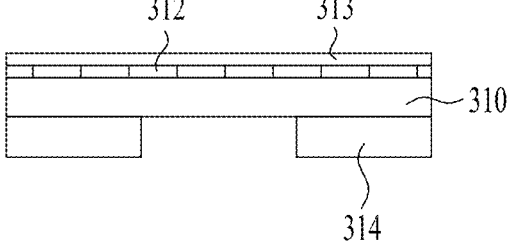
FIG. 6 is a cross-sectional view of a light source module according to the first embodiment of the present disclosure.

FIG. 5 is an enlarged view of portion A in FIG. 3, and FIG. 6 is a cross-sectional view of the light source module according to the first embodiment of the present disclosure.

Referring to FIG. 5, it can be seen that the individual light-emitting elements 312 are mounted linearly in one direction (the longitudinal direction of the panel). In this case, a protective portion 313 may be located outside the light-emitting elements 312 in order to protect the light-emitting elements 312.

Red, green, and blue light-emitting elements 312 may form one pixel in order to realize natural colors, and the individual pixels may be mounted in one direction on panel 310.

Referring to FIG. 6, the light-emitting elements 312 may be protected by the protective portion 313. Further, as described above, the drivers 314 may be mounted on the rear surface of the panel 310, and may drive the light-emitting elements 312 in units of pixels or subpixels. In this case, one driver 314 may individually drive at least one pixel.

Figure 7:
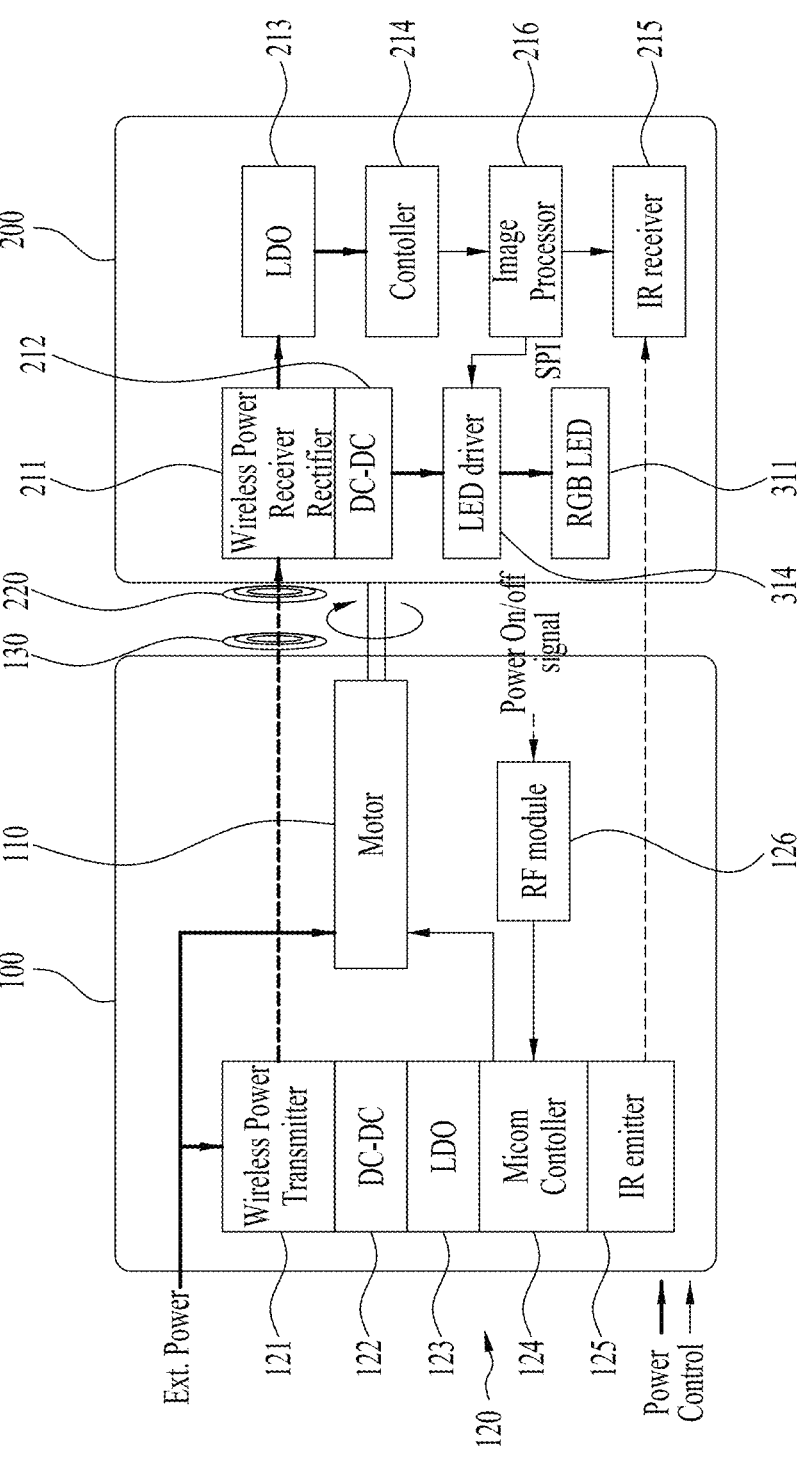
FIG. 7 is a block diagram of the rotatable display device according to an embodiment of the present disclosure.

FIG. 7 is a block diagram of the rotatable display device according to an embodiment of the present disclosure.

Hereinafter, a configuration for driving the rotatable display device will be described briefly with reference to FIG. 7. Although this configuration will be described with reference to the first embodiment described above, the same may also be identically applied to the second embodiment.

First, a driving circuit 210 may be mounted to the fixed portion 100. The driving circuit 120 may include a power supply. The driving circuit 120 may include a wireless power transmitter 121, a DC-DC converter 122, and a voltage generator 123 for supplying individual voltages.

External power may be supplied to the driving circuit 120 and the motor 110.

In addition, an RF module 126 may be provided at the fixed portion 100, so that the display may be driven in response to a signal transmitted from the outside.

Meanwhile, a means for sensing rotation of the rotary portion 200 may be provided at the fixed portion 100. Infrared radiation may be used to sense rotation. Accordingly, an IR emitter 125 may be mounted to the fixed portion 100, and an IR receiver 215 may be mounted to the rotary portion 200 at a position corresponding to the IR emitter 125.

In addition, a controller 124 may be provided at the fixed portion 100 in order to control the driving circuit 120, the motor 110, the IR emitter 125, and the RF module 126.

Meanwhile, the rotary portion 200 may include a wireless power receiver 211 for receiving a signal from the wireless power transmitter 121, a DC-DC converter 212, and a voltage generator (LDO) 213 for supplying individual voltages.

The rotary portion 200 may be provided with an image processor 216 in order to realize an image through the light-emitting element array using RGB data of an image to be displayed. The signal processed by the image processor 216 may be transmitted to the drivers 314 of the light source module, and thus an image may be realized.

In addition, a controller 214 may be mounted to the rotary portion 200 in order to control the wireless power receiver 211, the DC-DC converter 212, the voltage generator (LDO) 213, the IR receiver 215, and the image processor 216.

The image processor 216 may generate a signal for controlling light emission from the light sources of the light source module based on data of an image to be output. At this time, the data for light emission from the light source module may be internal data or external data.

The data stored in the internal device (the rotary portion 200) may be image data pre-stored in a storage device, such as a memory (an SD-card) mounted together with the image processor 216. The image processor 216 may generate a light emission control signal based on the internal data.

The image processor 216 may transmit control signals to the drivers 314 so that the first light-emitting element arrays 311 and the second light-emitting element arrays 341, 351, 361 display image data of a specific frame in a delayed manner.

Meanwhile, the image processor 216 may receive image data from the fixed portion 100. At this time, external data may be output through an optical data transmission device, such as a photo coupler, or an RF-type data transmission device, such as a Bluetooth or Wi-Fi device.

In this case, as mentioned above, a means for sensing rotation of the rotary portion 200 may be provided. That is, the IR emitter 125 and the IR receiver 215 may be provided as a means for detecting the rotational position (speed) of the rotary portion 200, such as an absolute rotational position or a relative rotational position, in order to output light source data suitable for each rotational position (speed) during rotation of the rotary portion 200. Alternatively, this function may also be achieved using an encoder, a resolver, or a Hall sensor.

Meanwhile, data required to drive the display may be transmitted as a signal in an optical manner at low cost using the principle of a photo coupler. That is, if the fixed portion 100 and the rotary portion 200 are provided with a light emitter and a light receiver, reception of data is continuously possible even when the rotary portion 200 rotates. Here, the IR emitter 125 and the IR receiver 215 described above may be used to transmit data.

As described above, power may be transferred between the fixed portion 100 and the rotary portion 200 in a wireless power transfer (WPT) manner.

Wireless power transfer enables the supply of power without connection of a wire using a resonance phenomenon of a coil.

To this end, the wireless power transmitter 121 may convert power into an RF signal of a specific frequency, and a magnetic field generated by current flowing through the transmission coil 130 may generate an induced current in the reception coil 220.

At this time, the natural frequency of the coil and the transmission frequency for transferring actual energy may differ from each other (a magnetic induction method).

Meanwhile, the resonant frequencies of the transmission coil 130 and the reception coil 220 may be the same (a magnetic resonance method).

The wireless power receiver 211 may convert the RF signal input from the reception coil 220 into direct current, and may transmit required power to a load.

Figure 8:
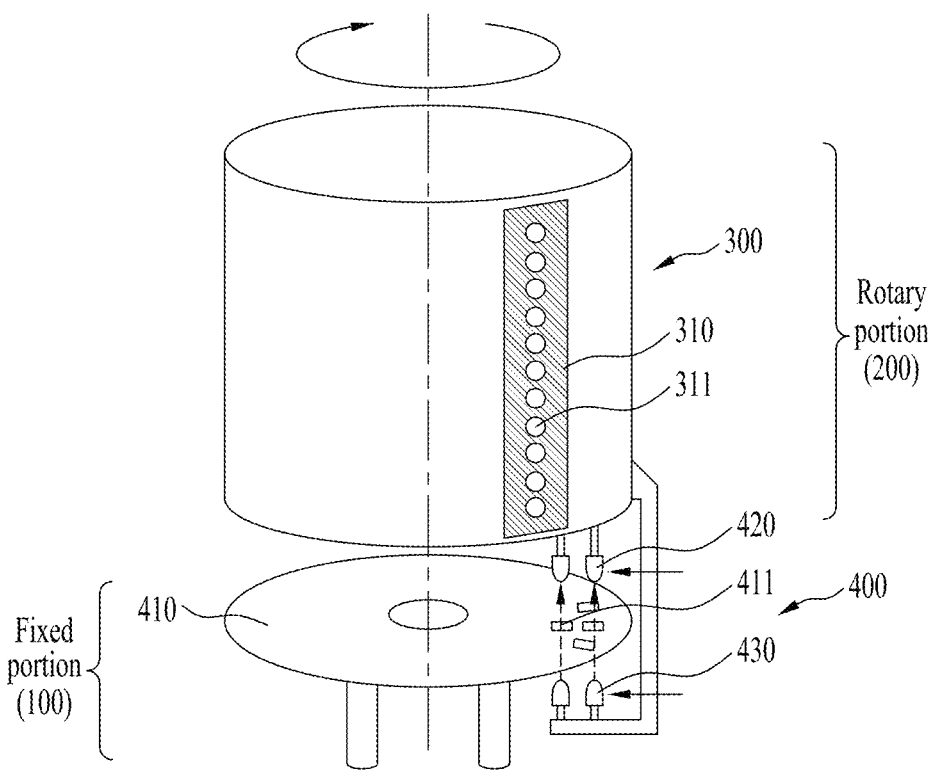
FIG. 8 is a schematic perspective view illustrating a state in which an encoder is applied to the rotatable display apparatus according to the embodiment of the present disclosure.

FIG. 8 is a schematic perspective view illustrating a state in which an encoder is applied to the rotatable display apparatus according to the embodiment of the present disclosure.

The rotatable display apparatus may include an encoder 400 between the fixed portion 100 and the rotary portion 200.

When the light source module 300 (or 301 in FIG. 2) equipped with the light-emitting device array 311 described above rotates and reproduces different information over time, the rotational speed of the light source modules 300 and 301 and a scanning frame should be synchronized to reproduce a desired image or video always at a constant position.

Hereinafter, the light source module 300 will be described focusing on the example of the rotatable display apparatus according to the first embodiment described above. However, the encoder 400 described below may equally be applied to light source modules of rotatable display apparatuses of the second embodiment and other embodiments.

There may be several methods to synchronize an image and a specific position of the light source modules 300 and 301. For example, the encoder 400 using infrared light may be applied.

In this way, according to the method using the infrared light, a light emitter 430 emits the infrared light, and the light receiver 420 receives the infrared light emitted periodically from the light emitter 430 each time the rotary portion 200 rotates, thereby scanning an image always at a constant position.

For example, the light emitter 430 and the light receiver 420 are connected to the rotary portion 200 and may rotate integrally with the rotary portion 200. A disc-shaped scaler 410 with a slit 411 may be located between the light emitter 430 and the light receiver 420. In this case, a plurality of slits 411 may be formed in the scaler 410 at regular intervals.

As described above, when the light emitter 430 and the light receiver 420 are connected to the rotary portion 200 and rotate integrally with the rotary portion 200, the scaler 410 may be located at a fixed position between the light emitter 430 and the light receiver 420. Accordingly, the light receiver 420 may receive the infrared light with a consistent period through the plurality of slits 411 located at regular intervals.

Figure 9:
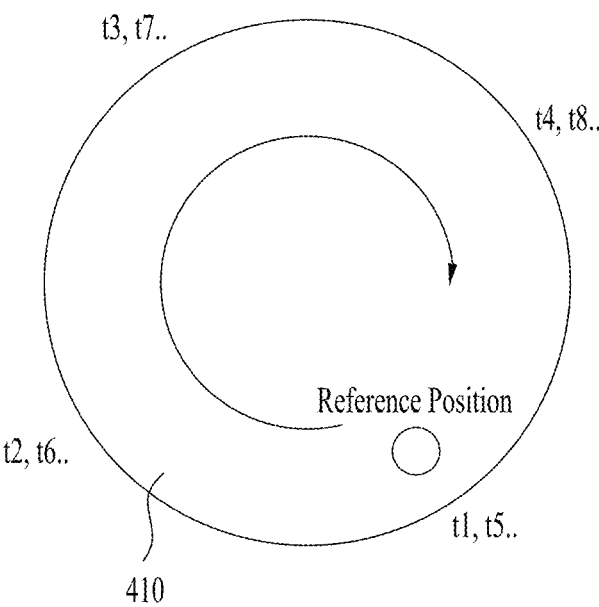
FIG. 9 is a schematic plan view illustrating an example of a scaler of the encoder applied to the rotatable display apparatus according to the embodiment of the present disclosure.
Figure 10:
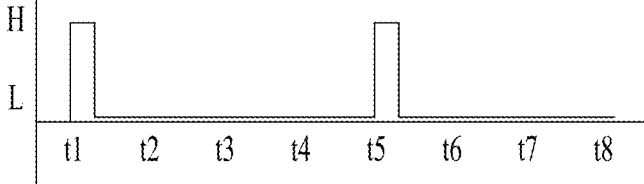
FIG. 10 is a diagram illustrating a light received signal of the encoder applied to the rotatable display apparatus according to the embodiment of the present disclosure.

FIG. 9 is a schematic plan view illustrating an example of a scaler of the encoder applied to the rotatable display apparatus according to the embodiment of the present disclosure. FIG. 10 is a diagram illustrating a light received signal of the encoder applied to the rotatable display apparatus according to the embodiment of the present disclosure.

FIG. 9 illustrates the scaler 410 of the encoder 400 viewed from above. The light source module 300 rotates together with the rotary portion 200 and starts scanning the first frame at a reference position t1 or t5 when the light source module 300 rotates. Next, when the light source module 300 rotates once and arrives at the reference position again, scanning of one frame may be completed. Thereafter, the light source module 300 starts scanning the second frame.

In this way, frame scanning may be started always at a constant position using the infrared light periodically generated at a constant position when the light source module 300 rotates.

For example, when the light receiver 420 receives the infrared light at time t1 at the reference position of the first frame, an infrared light received signal is input as high at time t1, as illustrated in FIG. 10. Then, at times t2, t3, and t4, infrared light reception does not occur and the remaining images are scanned.

Thereafter, when the light source module 300 rotates once and is located at the reference position again (time t5), the light receiver 420 receives the infrared signal (High signal) again and starts scanning the second frame.

In this way, if the frame is synchronized always at a constant position when the light source module 300 rotates, problems including movement of the frame, instead of the frame being formed at a fixed position, or shaking or distortion of the frame may be prevented.

Meanwhile, even when scanning is performed by synchronizing a frame and a position at time t1, momentary shaking of the image or distortion of an image may occur in a duration in which the rotational speed of the rotary portion 200 changes until the next reference position t5 while the light source module 300 rotates.

Therefore, constant speed control of the rotary portion 200 may be required. Constant speed control refers to controlling a motor to maintain a constant speed by detecting the rotational speed of the rotary portion 200 when the rotational speed of the rotary portion 200 changes structurally due to eccentricity of the rotary portion 200.

However, even if the motor having such a constant speed control function is used, a physical time to adjust speed by detecting the rotational speed of the rotary portion 200 and changing the force (torque) of a rotary body is inevitably greater than a scanning time (about 1/60 seconds) corresponding to one display frame of the light source module 300. Therefore, in a situation in which the speed of the motor is not constant, it may be very difficult to control the motor such that the rotary portion 200 rotates at a constant speed.

Figure 11:
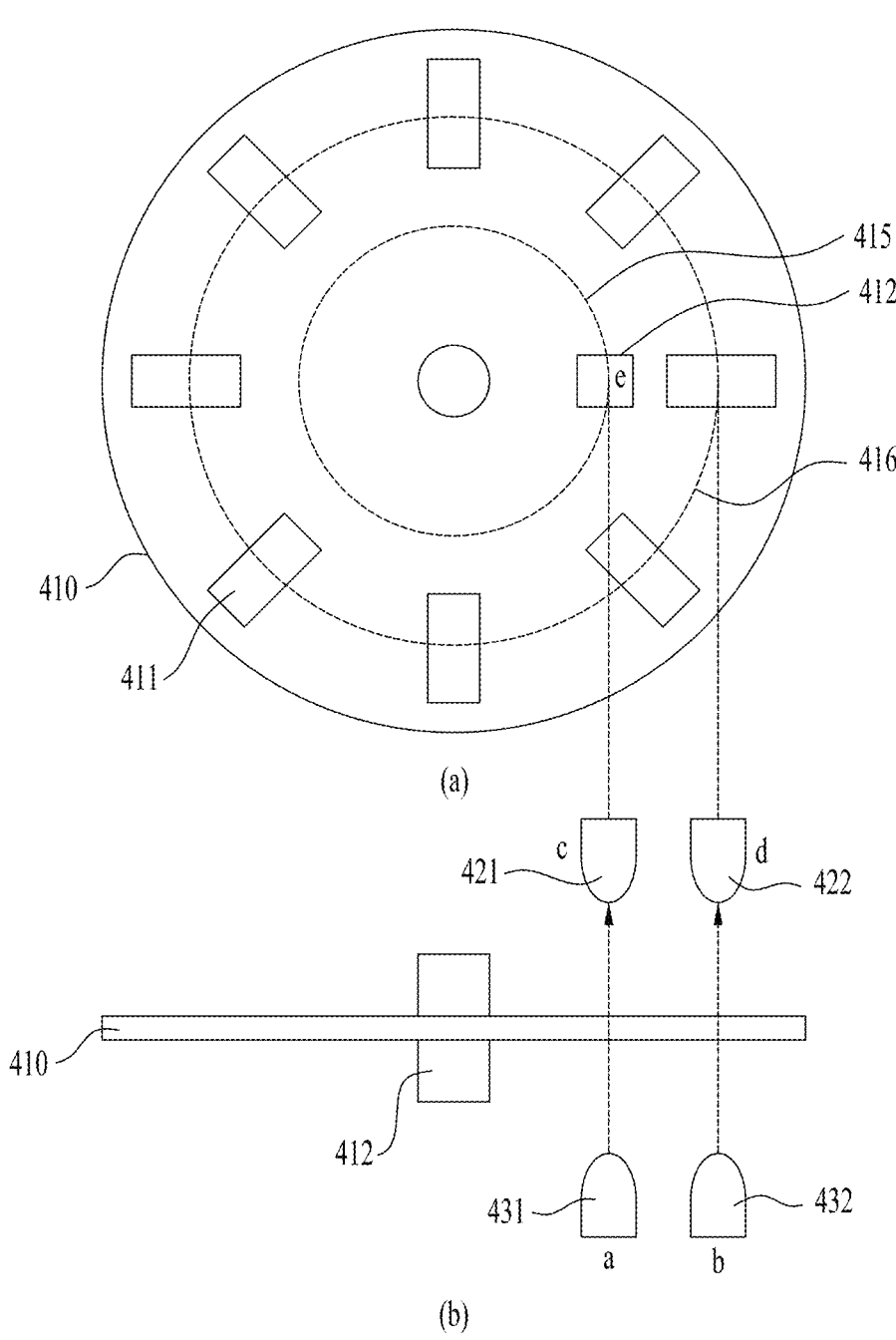
FIG. 11 is a diagram illustrating a first embodiment of the encoder applied to the rotatable display apparatus according to the embodiment of the present disclosure.

FIG. 11 is a diagram illustrating a first embodiment of the encoder applied to the rotatable display apparatus according to the embodiment of the present disclosure.

FIG. 11 illustrates a method in which the encoder 400 is equipped with the scaler 410 to receive information about various positions. FIG. 11(a) illustrates the scaler 410 viewed from above, and FIG. 11(b) illustrates the scaler 410 viewed from the side.

The scaler 410 of the encoder 400 is fixed, for example, by a supporter 412, and the plurality of slits 411 may be formed radially in the scaler 410 in a circumferential direction based on a center point.

Infrared light receivers 421 and 422 and light emitters 431 and 432, connected to the rotary portion 200, may rotate together with the rotary portion 200. In this case, light emitted from the light emitters 431 and 432 may pass through the slits 411 of the scaler 410 and be input to the light receivers 421 and 422. Therefore, while the rotary portion 200 rotates, signals corresponding to the number of slits may be received through the light receivers 421 and 422.

In this case, the scaler 410 may have a slit 412 (e) for receiving position information (trigger signal) of the first scanning line of the display implemented through the light source module 310 may be located on a first orbit 415. Additionally, the scaler 410 may have the plurality of slits 411 disposed on a second orbit 416 to receive position information for improving frame distortion due to a change in the rotational speed of the rotary portion 200.

In this way, in order to receive two signals, the two light emitters 431 and 432 may be provided at positions a and b, and the two light receivers 421 and 422 may be provided at positions c and d.

In this case, the size of the scaler 410 and the size of a rotary structure for rotating the rotary portion 200 may also increase in proportion to the number of signals due to optical paths including the two orbits 415 and 416.

Figure 12:
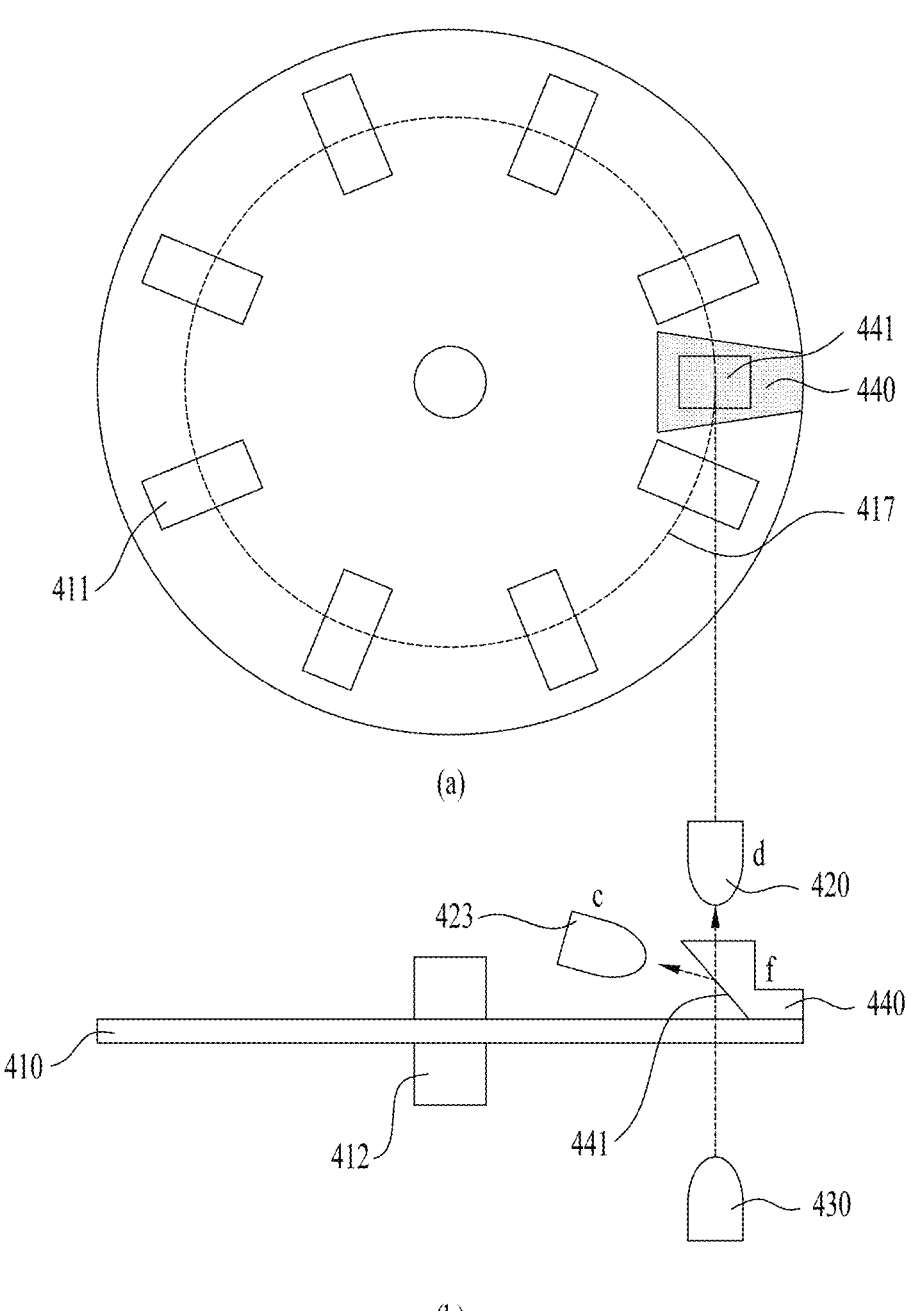
FIG. 12 is a diagram illustrating a second embodiment of the encoder applied to the rotatable display apparatus according to the embodiment of the present disclosure.

FIG. 12 is a diagram illustrating a second embodiment of the encoder applied to the rotatable display apparatus according to the embodiment of the present disclosure.

FIG. 12 illustrates an embodiment that may have an optical path which is more efficient than an optical path of the first embodiment above. FIG. 12 illustrates a method in which the encoder 400 is equipped with the scaler 410 to receive information about various positions. FIG. 12(a) illustrates the scaler 410 viewed from above, and FIG. 12(b) illustrates the scaler 410 viewed from the side.

In the second embodiment, the configuration except for the encoder 400 may be the same as the configuration of the embodiment of the rotatable display apparatus described above.

That is, the configuration including the fixed portion 100 having the motor 110, the rotary portion 200 that is located on the fixed portion 100 and rotates by the motor 110, and the light source module 310 that is coupled to the rotary portion 200 and includes the light-emitting device array 311 displaying an image using an afterimage caused by rotation of the rotary portion 200 may equally be applied to the present embodiment.

Referring to FIG. 12, the configuration of the encoder 400 applicable to the rotatable display apparatus according to the second embodiment is illustrated.

This encoder 400 is located between the fixed portion 100 and the rotary portion 200 and may synchronize an image displayed by the light-emitting device array 311 at a constant position when the rotary portion 200 rotates.

In addition, the encoder 400 may include a light emitter 430 that continuously emits light, a light receiver 420 that receives the light emitted from the light emitter 430 through at least two paths, and a disc-shaped scaler 410 that is located between the light emitter 430 and the light receiver 420 and equipped with a plurality of slits 411 in a circumferential direction. Additionally, the light receiver 420 may receive the light emitted from the light emitter 430 in at least two different periods.

In this case, the light receiver 420 and the light emitter 430 may rotate relative to the scaler 410. For example, the light receiver 420 and the light emitter 430 may be fixed and may rotate together with the rotary portion 200, and the scaler 410 may be fixed in a state in which the slits 411 may periodically pass the light emitted from the light emitter 430.

As another example, the scaler 410 may rotate together with the rotary portion 200 in a state in which the slits 411 are arranged to periodically pass the light emitted from the light emitter 430, and the light receiver 420 and the light emitter 410 may be in a fixed state.

Referring to FIG. 12, the scaler 410 of the encoder 400 is fixed, for example, by a supporter 412 and has the plurality of slits 411 formed radially along one circumferential orbit 417 in a circumferential direction based on a center point.

As mentioned above, the infrared light receiver 420 and the light emitter 430, connected to the rotary portion 200, may rotate together with the rotary portion 200. In this case, the light emitted from the light emitter 430 may pass through the slits 411 of the scaler 410 and be input to the light receiver 420. Therefore, while the rotary portion 200 rotates, the light receiver 420 may receive signals corresponding to the number of slits.

As an exemplary embodiment, the light receiver 420 (hereinafter referred to as a first light receiver) that receives the light emitted from the light emitter 430 through a first path may be provided, and a second light receiver 423 that receives the light emitted from the light emitter 430 through a second path different from the first path may further be provided.

In this way, a light receiver may include the first light receiver 420 that receives the light emitted from the light emitter 430 through the first path and the second light receiver 423 that receives the light emitted from the light emitter 430 through the second path.

According to the embodiment, the one light emitter 430 may emit light through at least two paths.

For this purpose, a switcher 440 (hereinafter referred to as a first switcher) located between any two of the slits 411 to switch the light emitted from the light emitter 430 to the second path may be provided.

This first switcher 440 may include an inclined surface 441 that switches the first path of the light emitted from the light emitter 430 to the second path.

As an exemplary embodiment, the first switcher 440 may include a reflector. That is, the reflector may be formed on the inclined surface 441. Hereinafter, since the inclined surface 441 may function as the reflector 441, the inclined surface and the reflector will be described using the same reference numeral.

This reflector 441 may be located on the inclined surface 441 which is formed in or attached to the first switcher 440 to switch the first path to the second path.

As an exemplary embodiment, the first switcher 440 may be located on the same circumferential line 417 as the plurality of slits 411.

In this way, a signal switched by the first switcher 440 may be a signal indicating a reference position of the light emitting module 310. That is, a signal received by or at the second light receiver 423 may be the signal indicating the reference position. The signal received by the second light receiver 423 may be the trigger signal described above.

That is, the first light receiver 420 may receive position information for improving frame distortion due to a change in the rotational speed of the rotary portion 200, and the second light receiver 423 may receive position information (trigger signal) of the first scanning line of the display implemented through the light source module 310.

According to the second embodiment, since the first switcher 440 capable of generating the trigger signal received by the second light receiver 423 is located on the same circumferential orbit 417 as the circumferential orbit 417 on which the slits 411 capable of receiving the position information are formed, a space occupied by the encoder 400 may be reduced. Since this circumferential orbit 417 may be configured on the outside of the scaler 410, the degree of freedom in spatial configuration below the scaler 410 may be increased. Due to this reduced space, components of the rotatable display apparatus may be arranged more efficiently.

According to this second embodiment, two signals may be generated using the one light emitter 420. Therefore, not only may the number of the light emitters 420 be reduced, but volume occupied by the light path may also be reduced.

In this way, the encoder 400 may use two signals including the signal received by the first light receiver 420 from the light emitter 430 through the first path and the signal received by the second light receiver 423 from the light emitter 430 through the second path. These two signals may be received without interference with each other.

In order to receive these two signals, the light emitter 430 located at one position and the two light receivers 420 and 423 located at positions c and d may be provided.

Figure 13:
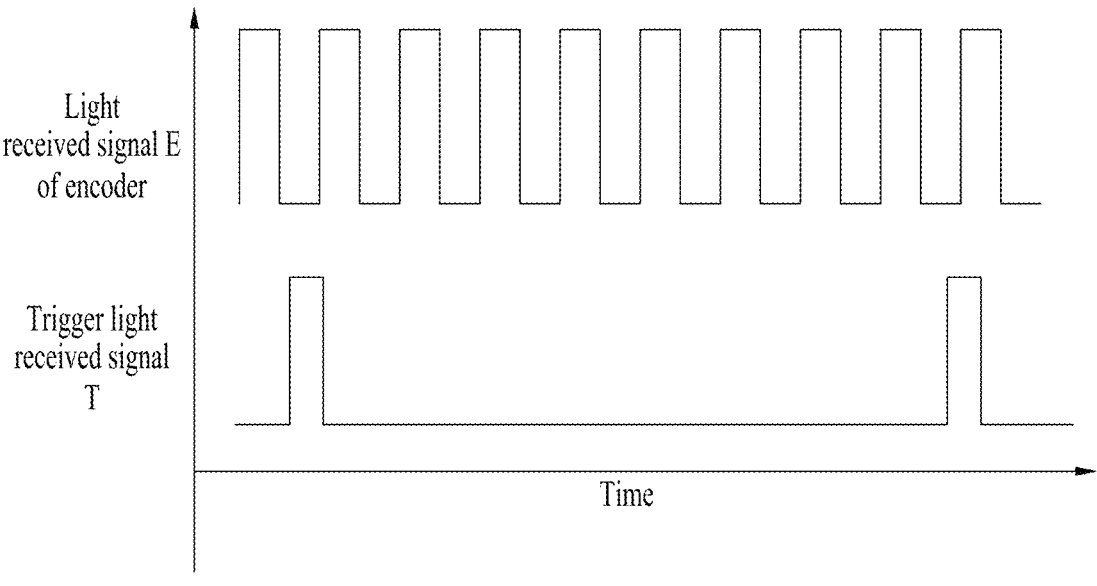
FIG. 13 is a diagram illustrating a light received signal according to the second embodiment of the encoder applied to the rotatable display apparatus according to the embodiment of the present disclosure.

FIG. 13 is a diagram illustrating a light received signal according to the second embodiment of the encoder applied to the rotatable display apparatus according to the embodiment of the present disclosure.

FIG. 13 illustrates waveforms of a received signal (light received signal E of the encoder) of a light-receiving device at position d forming the first light receiver 420 and a received signal (trigger light received signal T) of a light-receiving device at position c forming the second light receiver 423 in the second embodiment described with reference to FIG. 12.

Referring to FIG. 12, as an exemplary embodiment, eight slits 411 may be provided. Therefore, referring to FIG. 13, eight pulses may be input when the rotary portion 200 rotates once. The signal switched (reflected) through the first switcher 440 at position f may be input to the second light receiver 423. The signal of the second light receiver 423 receives one pulse when the rotary portion 200 rotates once.

In this way, through the position information received through the first light receiver 420, frame distortion caused by a change in the rotational speed of the rotary portion 200 may be improved. Additionally, the display may be synchronized according to rotational speed through the position information (trigger signal) of the first scanning line of the display received through the second light receiver 423.

Figure 14:
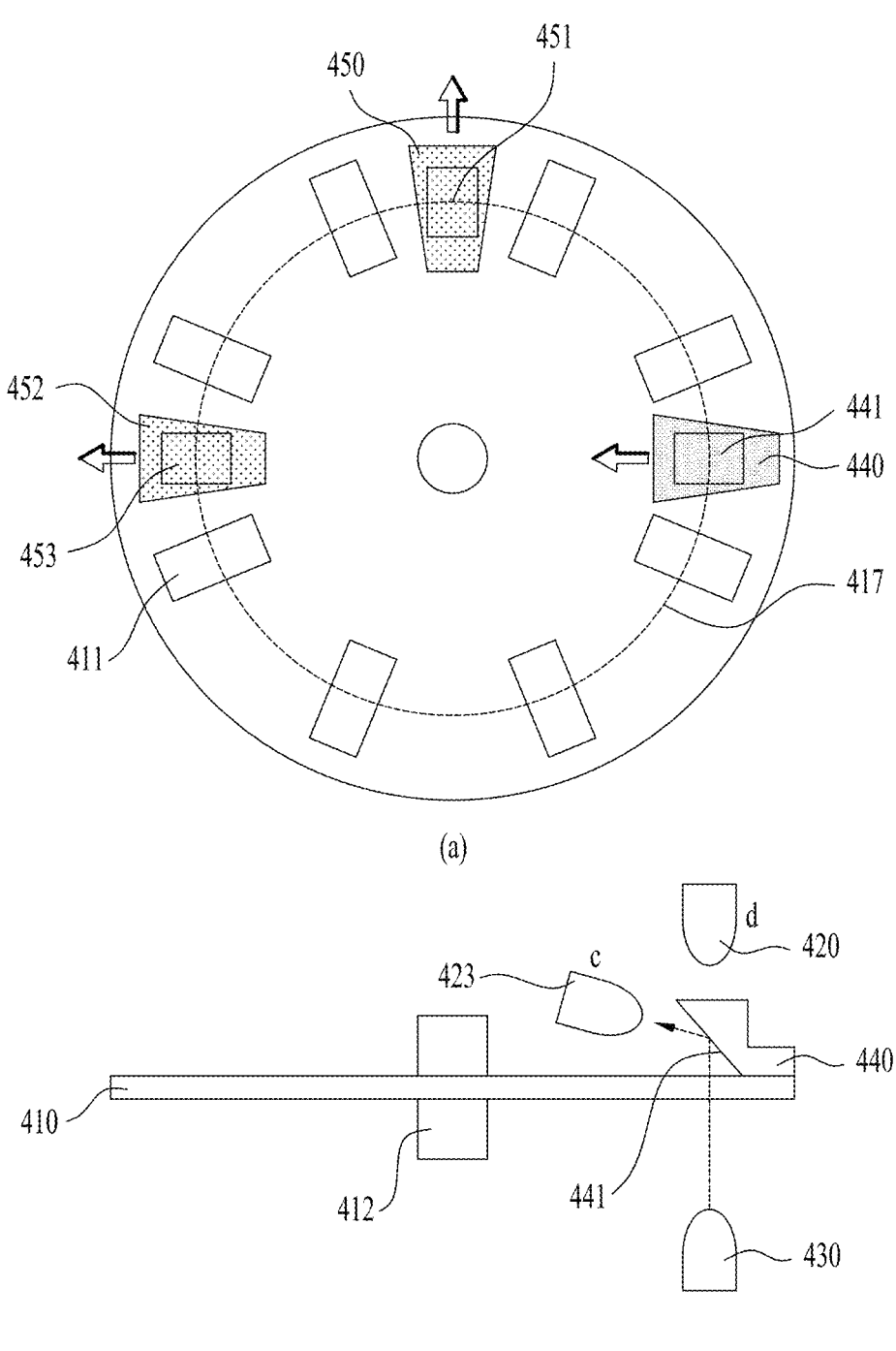
FIGS. 14 and 15 are diagrams illustrating a third embodiment of the encoder applied to the rotatable display apparatus according to the embodiment of the present disclosure.
Figure 15:
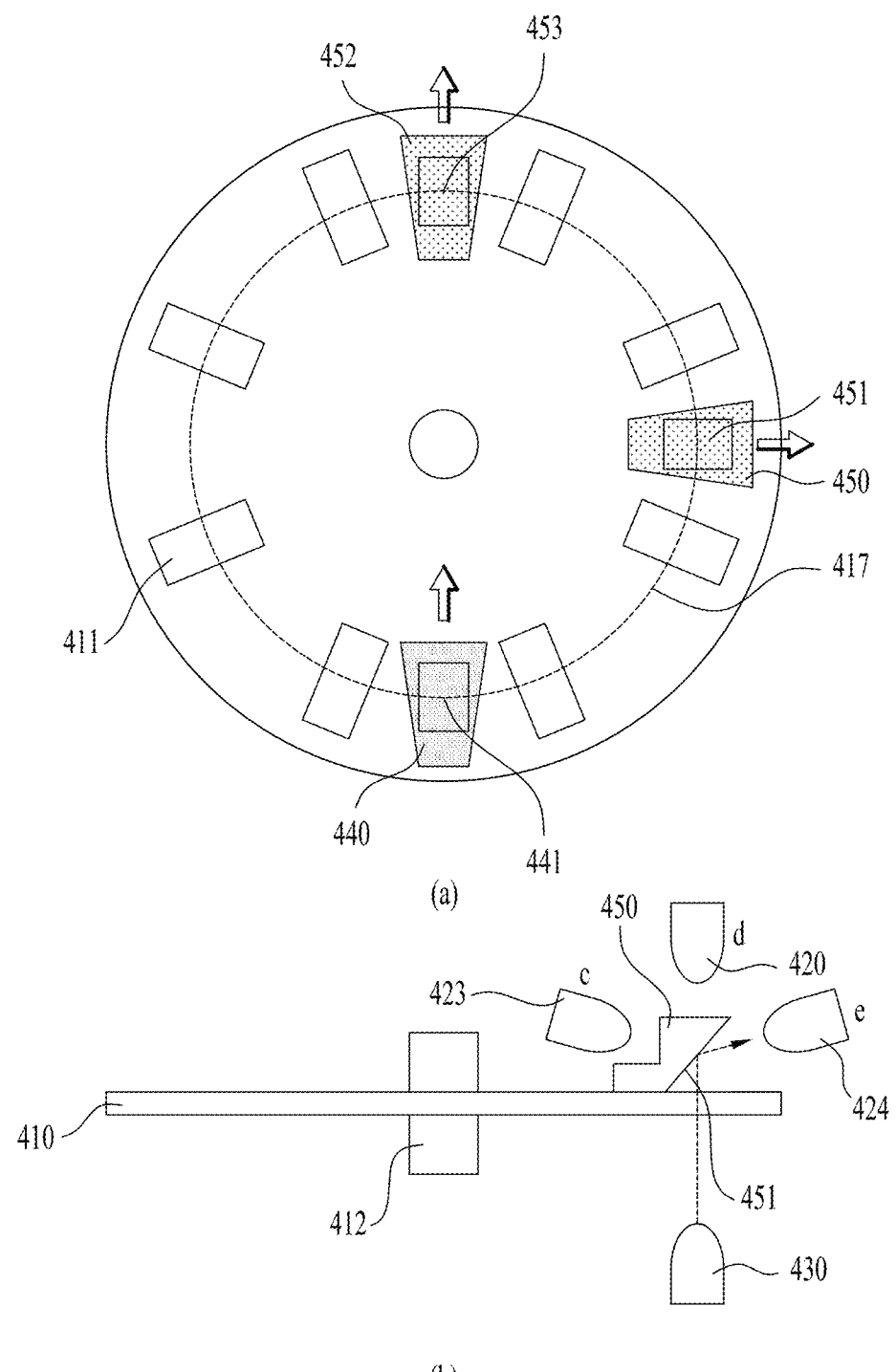

FIGS. 14 and 15 are diagrams illustrating a third embodiment of the encoder applied to the rotatable display apparatus according to the embodiment of the present disclosure.

FIGS. 14 and 15 illustrate another embodiment that may have an optical path more efficient than the optical path in the first embodiment above. FIGS. 14 and 15 illustrate a method in which the encoder 400 is equipped with the scaler 410 to receive information about various positions. FIG. 15 illustrates a state rotated by 90 degrees clockwise from FIG. 14.

FIGS. 14(*a*) and 15(*a*) show the scaler 410 viewed from above, and FIGS. 14(*b*) and 15(*b*) show the scaler 410 viewed from the side.

The configuration except for the encoder 400 illustrated in FIGS. 14 and 15 may be the same as the configuration described in the embodiment of the rotatable display apparatus described above.

That is, the configuration including the fixed portion 100 having the motor 110, the rotary portion 200 that is located on the fixed portion 100 and rotates by the motor 110, and the light source module 310 that is coupled to the rotary portion 200 and includes the light-emitting device array 311 displaying an image using an afterimage caused by rotation of the rotary portion 200 may equally be applied to the present embodiment.

Referring to FIGS. 14 and 15, the configuration of the encoder 400 applicable to the rotatable display apparatus according to the second embodiment is illustrated.

The encoder 400 is located between the fixed portion 100 and the rotary portion 200 and may synchronize an image displayed by the light-emitting device array 311 at a constant position when the rotary portion 200 rotates.

In addition, the encoder 400 may include a light emitter 430 that continuously emits light, a light receiver 420 that receives the light emitted from the light emitter 430 through at least two paths, and a disc-shaped scaler 410 that is located between the light emitter 430 and the light receiver 420 and equipped with a plurality of slits 411 in a circumferential direction. Additionally, the light receiver 420 may receive the light emitted from the light emitter 430 in at least two different periods.

Referring to FIGS. 14 and 15, the scaler 410 of the encoder 400 is fixed, for example, by a supporter 412 and has the plurality of slits 411 formed radially along one circumferential orbit 417 in a circumferential direction based on a center point.

As mentioned above, the infrared light receiver 420 and the light emitter 430, connected to the rotary portion 200, may rotate together with the rotary portion 200. In this case, the light emitted from the light emitter 430 may pass through the slits 411 of the scaler 410 and be input to the light receiver 420. Therefore, while the rotary portion 200 rotates, the light receiver 420 may receive signals corresponding to the number of slits.

As an exemplary embodiment, the light receiver 420 (hereinafter referred to as a first light receiver) that receives the light emitted from the light emitter 430 through a first path may be provided, and a second light receiver 423 that receives the light emitted from the light emitter 430 through a second path different from the first path may further be provided. Further, according to this embodiment, a third light receiver 424 that receives the light emitted from the light emitter 430 through a third path may further be provided.

In this way, a light receiver may include the first light receiver 420 that receives the light emitted from the light emitter 430 through the first path, the second light receiver 423 that receives the light emitted from the light emitter 430 through the second path 423, and the third light receiver 424 that receives the light emitted from the light emitter 430 through the third path.

According to the embodiment, light may be emitted through at least two paths using one light emitter 430.

For this purpose, a switcher 440 (hereinafter referred to as a first switcher) located between any two of the slits 411 to switch the light emitted from the light emitter 430 to the second path may be provided.

In addition, as an exemplary embodiment, switchers 450 and 452 (hereinafter referred to as second switchers) located between any two of the slits 411 to switch the light emitted from the light emitter 430 to the third path may further be provided.

The third light receiver 424 may additionally receive a signal through these second switchers 450 and 452. In this way, the rotation of the rotatable display apparatus may be more precisely controlled or corrected using the additionally received signal.

Referring to FIGS. 14 and 15, an example of configuring the two second switchers 450 and 452 is shown. However, the number of second switchers is not limited to two. When the two second switchers 450 and 452 are configured in this way, after receiving a trigger signal through the second light receiver 423, two additional signals may be received.

As an exemplary embodiment, the third path may be in an opposite direction to the second path. For example, as shown in FIGS. 14 and 15, the first switcher 440 and the second switchers 450 and 452 may be installed in opposite directions on the scaler 410.

These second switchers 450 and 452 may include inclined surfaces 451 and 453, respectively, that switch the first path to the third path.

As an exemplary embodiment, like the first switcher 440, the second switchers 450 and 452 may include reflectors. That is, the reflectors may be formed on the inclined surfaces 451 and 453. Hereinafter, since the inclined surfaces 451 and 453 may function as the reflectors 451 and 453, the inclined surfaces and the reflectors will be described using the same reference numerals.

These reflectors 451 and 453 may be located on the inclined surfaces 451 and 453 formed in or attached to the second switchers 450 and 452 to switch the first path to the third path.

As an exemplary embodiment, the second switchers 450 and 452 may be located on the same circumferential line 417 as the plurality of slits 411.

The description of the second embodiment may be equally applied to parts not described herein. Hereinafter, a description that overlaps with the second embodiment will be omitted.

According to this third embodiment, three or more signals may be generated using the one light emitter 420. Therefore, not only may the number of the light emitters 420 be reduced, but volume occupied by the light path may also be reduced.

In this way, the encoder 400 may use three or more signals including the signal received by the first light receiver 420 from the light emitter 430 through the first path and the signal received by the second light receiver 423 from the light emitter 430 through the second path. These three or more signals may be received without interference with each other.

In order to receive these three or more signals, the light emitter 430 located at one position and three light receivers 420, 423, and 424 located at positions c, d, and e may be provided.

Figure 16:
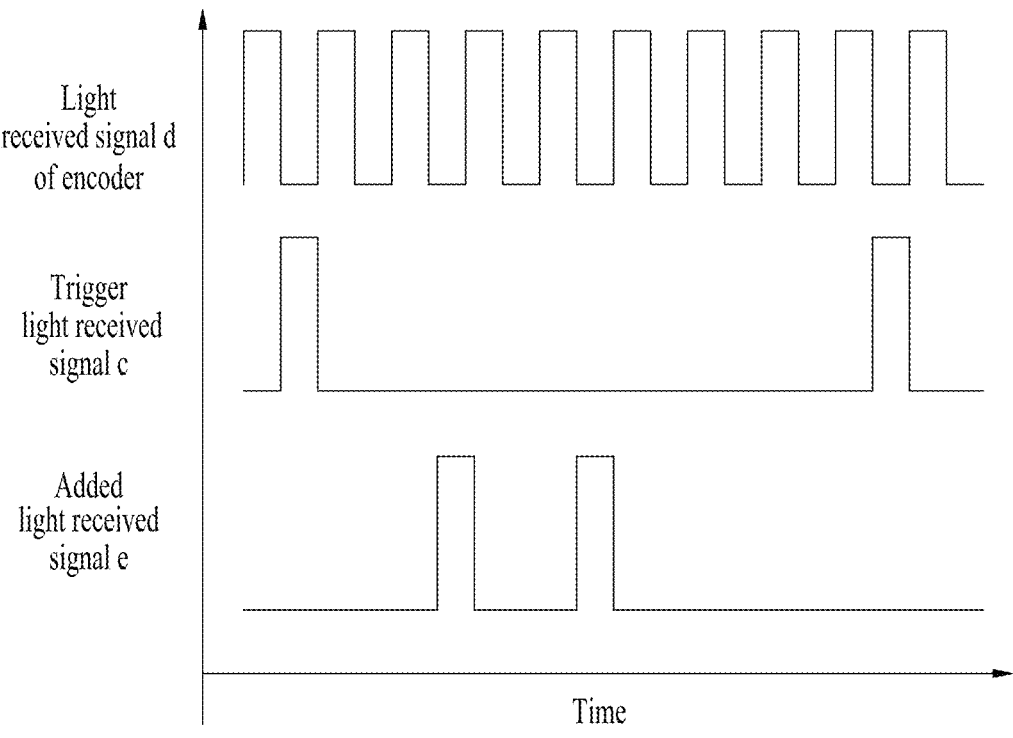
FIG. 16 is a diagram illustrating a light received signal according to the third embodiment of the encoder applied to the rotatable display apparatus according to the embodiment of the present disclosure.

FIG. 16 is a diagram illustrating a light received signal according to the third embodiment of the encoder applied to the rotatable display apparatus according to the embodiment of the present disclosure.

FIG. 16 illustrates waveforms of a received signal (light received signal d of the encoder) of a light-receiving device at position d forming the first light receiver 420, a received signal (trigger light received signal c) of a light-receiving device at position c forming the second light receiver 423, and a received signal (added light received signal e) of a light-receiving device at position e forming the third light receiver 424 in the third embodiment described with reference to FIGS. 14 and 15.

Referring to FIGS. 14 and 15, as an exemplary embodiment, eight slits 411 may be provided. Therefore, referring to FIG. 16, eight pulses may be input when the rotary portion 200 rotates once. The signal switched (reflected) through the first switcher 440 may be input to the second light receiver 423. The second light receiver 423 receives one pulse when the rotary portion 200 rotates once. In addition, it may be appreciated that the signal e received by the third light receiver 424 through the second switchers 450 and 452 generates two pulses per rotation of the rotary portion 200. In this way, if the second switchers 450 and 452 are configured by varying the angle of the first switcher 440, many signals may be generated through an optical path using the one light emitter 420.

In this way, through the position information received through the first light receiver 420, frame distortion caused by a change in the rotational speed of the rotary portion 200 may be improved. Additionally, the display may be synchronized according to rotational speed through the position information (trigger signal) of the first scanning line of the display received through the second light receiver 423. Furthermore, the additional signal may control the rotary portion 200 more precisely or may be used for other purposes.

The features, structures, effects, and so on described above in the embodiments are included in at least one embodiment of the present disclosure and are not necessarily limited to only one embodiment. In addition, features, structures, effects, and so on exemplified in each embodiment may be combined with or modified to other embodiments by those skilled in the art to which the embodiments belong. Therefore, it should be interpreted that such combinations and modifications are included within the scope of the present disclosure.

While the present disclosure has been described with reference to exemplary embodiments, it should be noted that the embodiments are merely examples and do not limit the scope of the present disclosure. It will be appreciated by those skilled in the art to which the present disclosure belongs that various modifications and applications beyond those illustrated herein are possible within the scope of the essential characteristics of the embodiments. For example, each component described in the embodiments may be modified in various ways. Differences related to the modifications and applications should be interpreted as being included within the scope of the present disclosure as defined in the appended claims.

INDUSTRIAL APPLICABILITY

According to the present disclosure, the rotatable display apparatus using a light source such as a micro LED may be provided.

The invention claimed is:

1. A rotatable display apparatus, comprising:
a fixed portion including a motor;
a rotary portion located on the fixed portion and configured to rotate by the motor;
a light source module coupled to the rotary portion and including a light-emitting device array configured to display an image using an afterimage caused by rotation of the rotary portion; and
an encoder located between the fixed portion and the rotary portion and configured to synchronize the image displayed by the light-emitting device array at a constant position based on rotation of the rotary portion, wherein the encoder includes:
a light emitter configured to continuously emit light;
a light receiver configured to receive the light emitted from the light emitter through at least two paths;
a disc-shaped scaler located between the light emitter and the light receiver and having a plurality of slits formed in a circumferential direction; and
a first switcher located between any two of the plurality of slits to switch the light emitted from the light emitter to a predetermined path of the at least two paths.

2. The rotatable display apparatus of claim 1, wherein the light receiver includes:
a first light receiver configured to receive the light emitted from the light emitter through a first path; and
a second light receiver configured to receive the light emitted from the light emitter through a second path.

3. The rotatable display apparatus of claim 1, wherein the first switcher includes a reflector.

4. The rotatable display apparatus of claim 3, wherein the reflector is formed in the first switcher and is located on an inclined surface configured to switch a first path to the predetermined path.

5. The rotatable display apparatus of claim 1, wherein the first switcher is located on a same circumferential line as the plurality of slits.

6. The rotatable display apparatus of claim 1, further comprising a second switcher located between any two of the plurality of slits to switch the light emitted from the light emitter to another one of the at least two paths.

7. The rotatable display apparatus of claim 6, wherein the another one of the at least two paths is in an opposite direction to the predetermined path.

8. The rotatable display apparatus of claim 7, further comprising a third light receiver configured to receive the light emitted from the light emitter through the another one of the at least two paths.

9. The rotatable display apparatus of claim 6, wherein second switcher includes an inclined surface configured to switch a first path to the another one of the at least two paths.

10. The rotatable display apparatus of claim 1, wherein the light source module is coupled to the rotary portion and includes the light-emitting device array arranged in a longitudinal direction on at least one panel arranged radially or at least one panel arranged along a cylindrical surface.

11. A rotatable display apparatus, comprising:
a fixed portion including a motor;
a rotary portion located on the fixed portion and configured to rotate by the motor;
a light source module coupled to the rotary portion and including a light-emitting device array configured to display an image using an afterimage caused by rotation of the rotary portion; and
an encoder located between the fixed portion and the rotary portion and configured to synchronize the image displayed by the light-emitting device array at a constant position based on rotation of the rotary portion, wherein the encoder includes:
a light emitter configured to continuously emit light;
a light receiver configured to receive the light emitted from the light emitter in at least two different periods;
a disc-shaped scaler located between the light emitter and the light receiver and having a plurality of slits formed in a circumferential direction; and
a first switcher located between any two of the plurality of slits to switch a direction of the light emitted from the light emitter toward the light receiver.

12. The rotatable display apparatus of claim 11, wherein the light receiver includes:
a first light receiver configured to receive the light emitted from the light emitter in a first period; and
a second light receiver configured to receive the light emitted from the light emitter in a second period.

13. The rotatable display apparatus of claim 11, wherein the first switcher is located on a same circumferential line as the plurality of slits.

14. The rotatable display apparatus of claim 11, wherein the first switcher includes a reflector.

15. The rotatable display apparatus of claim 14, wherein the reflector is formed in the first switcher and is located on an inclined surface configured to switch a first path to a second path.

16. The rotatable display apparatus of claim 12, wherein a signal received by the second light receiver is a signal indicating a reference position of the light source module.

17. The rotatable display apparatus of claim 11, further comprising a second switcher located between any two of the plurality of slits to switch the light emitted from the light emitter to a third path.

18. The rotatable display apparatus of claim 17, further comprising a third light receiver configured to receive the light emitted from the light emitter through the third path.

\*　\*　\*　\*　\*